Dec. 1, 1970 — C. L. BAUER — 3,544,234
COMBINED SPEED CONTROL-EJECTOR FOR KITCHEN MIXER
Filed June 16, 1969 — 2 Sheets-Sheet 1

INVENTOR.
Charles L. Bauer
BY Delbert Hooper
ATTORNEY.

Dec. 1, 1970  C. L. BAUER  3,544,234
COMBINED SPEED CONTROL-EJECTOR FOR KITCHEN MIXER
Filed June 16, 1969  2 Sheets-Sheet 2

INVENTOR.
Charles L. Bauer
BY
ATTORNEY.

United States Patent Office 3,544,234
Patented Dec. 1, 1970

3,544,234
COMBINED SPEED CONTROL-EJECTOR FOR KITCHEN MIXER
Charles L. Bauer, Cheshire, Conn., assignor to Scovill Manufacturing Company, Waterbury, Conn., a corporation of Connecticut
Filed June 16, 1969, Ser. No. 833,322
Int. Cl. A22c 5/00
U.S. Cl. 416—170                    1 Claim

ABSTRACT OF THE DISCLOSURE

A single element control for a mixer provides simple, reliable beater ejector means operable on one side of the "off" position. Mixer speed is selectable on the other side of the "off" position. The ejector means comprises a simple lever bar disposed longitudinally of the mixer housing.

---

This invention relates to a kitchen mixer. More specifically, the invention relates to a mixer having a single control means for both speed of the beaters and for beater ejection, and provides simple, reliable linkages to implement the controls.

In the prior art, there are disclosed kitchen mixers having various means for controlling speed and usually separate means for effecting beater ejection so that the beaters may be easily removed for washing after use. In U.S. Pat. 2,605,085 to Gerry there is provided a single control means for both motor speed and beater ejection.

The devices of the prior art, however, have been objectionable for their plurality of controls, each involving its own set of linkages and its own irregularities in the lines of the mixer, which irregularities have made the device more difficult to keep clean. Devices with single controls have presented complicated, unreliable linkages.

For a mixer, the present invention provides a single control for motor speed and beater ejection with simple and reliable linkages.

Other features of the invention will be apparent from a reading of the following specification and examination of the drawings wherein.

Figure 1:
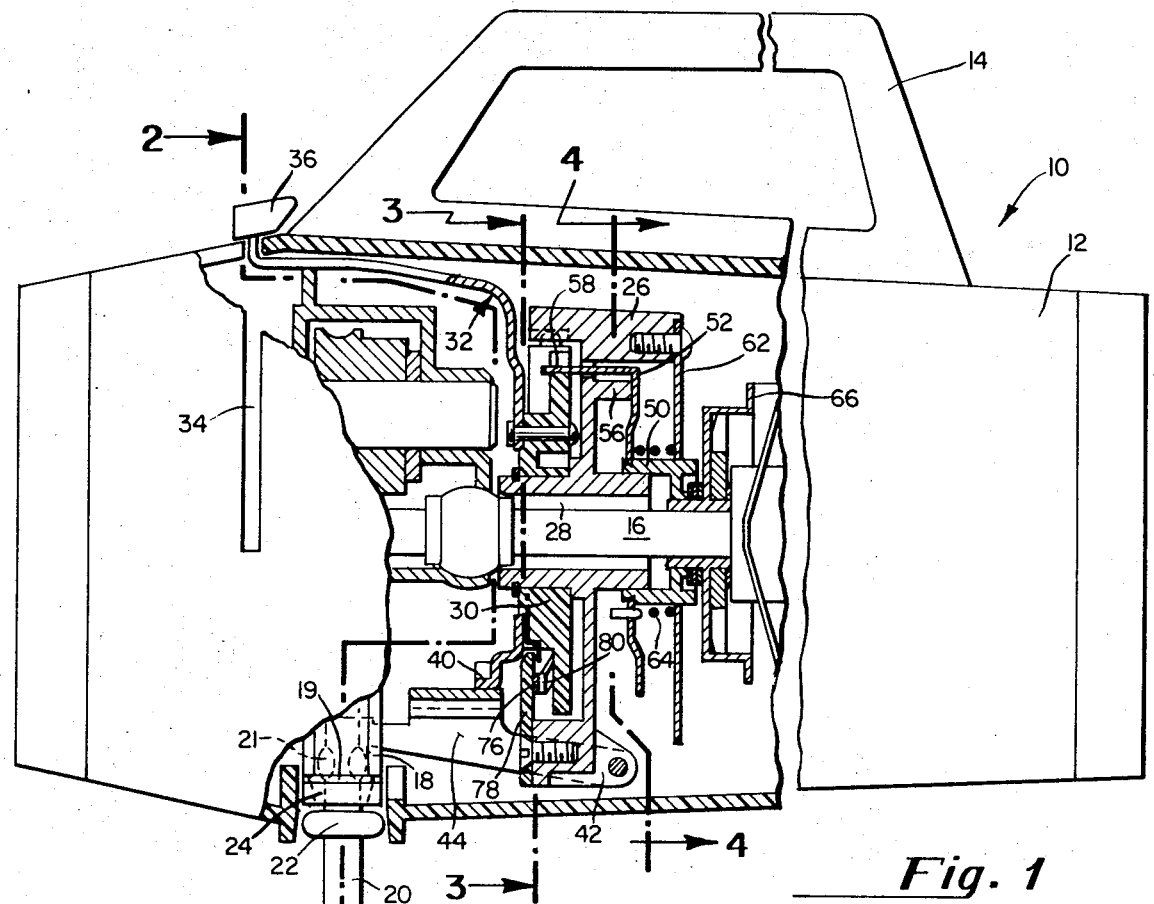
FIG. 1 is a fragmentary side elevation of a mixer embodying the invention with the housing broken away to display the control linkages in section along the line 1—1 of FIG. 3.

Referring more specifically to the drawings, a mixer body embodying the invention is generally designated 10 in FIG. 1. It comprises a generally cylindrical housing 12 having a handle 14. The electric motor drive means (not shown) are mounted in the rightward end of the housing 12 and the motor drive shaft 16 extends leftward approximately along the axis of the housing.

Rotation of the drive shaft 16 is transmitted through the conventional worm gear and worm pinion means (not shown) to a pair of spaced, downwardly directed spindles 18. Held in the spindles by conventional spring detent rings 19 are a pair of beaters 20. The stem of each beater is formed with detent engaging ears 21 and an outward flange 22 below the spindle. These flanges are engaged in the ejection process by a yoke 24 mounted for vertical movement in the housing.

Figure 2:
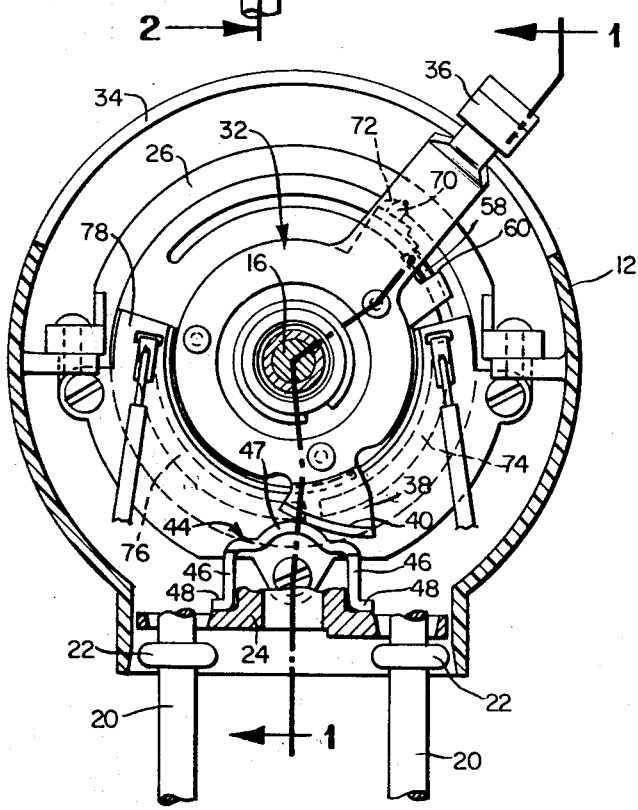
FIG. 2 is a sectional view taken on the line 2—2 of FIG. 1.

An annular control base 26 is mounted transversely in the housing 12 and circumposes the shaft 16. Base 26 is stationary. Its central opening 28 is amply dimensioned to not interfere with the rotation of the shaft. The leftward end of the base 26 mounts for rotation an actuator hub 30 which has riveted thereto an actuator control arm 32. The arm at its distal end extends through a circumferential slot 34 in the housing 12 and terminates in a control button 36. The end of the arm 32 which is attached to the hub is annular and circumposes the shaft 16. As shown in FIG. 2, an outwardly formed cam portion 38 is stepped away from the attached portion of the arm 32 and is formed with a perpendicular face 40.

Pivotally mounted on a pin extending between spaced legs 42 and on the base 26 is an ejector lever 44. The lever 44 comprises a pair of spaced plates 46 (FIG. 2) with an intermediate bridge 47 having a central hump which is engaged by the cam face 40. The distal ends 48 of the ejector lever engage spaced points on the yoke 24.

For ejection, the button 36 is rotated in a clockwise direction. Cam face 40 will move the ejector lever 44 downward so that the yoke 24 engages the flanges 22 and eject each beater 20 exerting a downward force which overcomes the resistance of ring 19.

Figure 4:
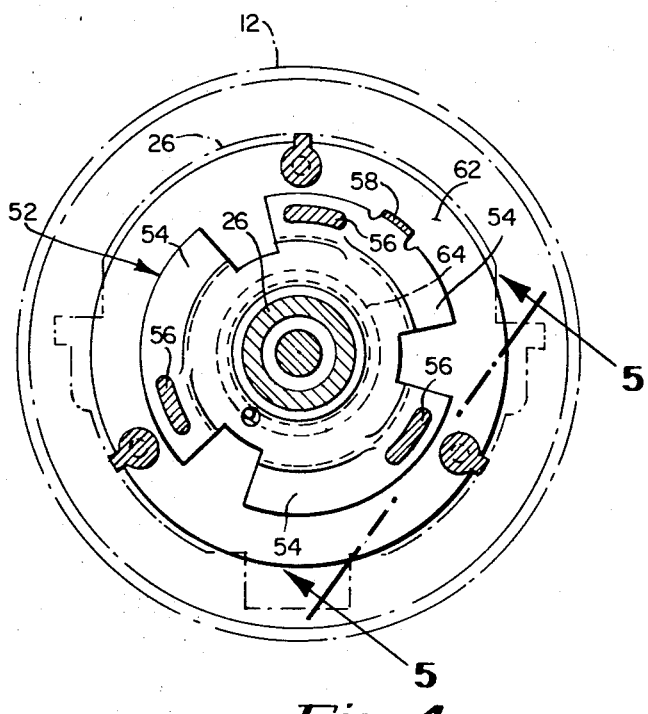
FIG. 4 is a sectional view taken on the line 4—4 of FIG. 1.
Figure 5:
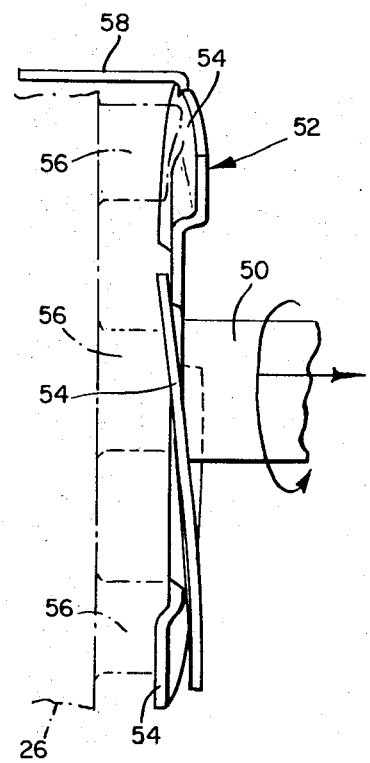
FIG. 5 is an enlarged view showing the governor control.

The speed control operating linkage is essentially as described in U.S. Pat. 2,455,026. Telescopically mounted on the tubular rightward end of the base 26 (FIG. 1) is the speed control collar 50. An actuating speed cam 52 surrounds the leftward end of the collar and is fixedly secured thereto. As shown in FIG. 4, the cam 52 is formed with three spaced lobes 54, each somewhat inclined with respect to a radial plane and engaging respectively three uniformly spaced fixed studs 56 on the base 26. An actuator drive arm 58 is formed on one of the lobes and extends perpendicularly thereto and through an arcuate slot in the base 26 to fit snugly in a notch 60 in the regulator hub 30. An annular spring retainer plate 62 is secured across the rightward end of the base 26 and its central opening permits passage of the speed control collar 50. An axial spring 64 is disposed between the cam 52 and the plate 62 to keep the speed cam 52 against the studs 56.

For regulating speed of the mixer motor, the button 36 is moved in a counterclockwise direction (shown in FIG. 2), the hub 30 through arm 58 similarly rotates the speed cam 52. Because of the deflection of the cam lobes, the collar 50 is (FIG. 1) moved leftward, thereby moving leftward the control ring 66 of a conventional motor speed control to speed up the motor. This control may be of the type disclosed in U.S. Pat. 2,445,026 to Seyfried. Oppositely, return of the button 36 in the clockwise direction to the position shown in FIG. 2 will permit the ring 66 to move back leftward and slow the motor down.

Formed on the hub 30 (FIG. 3) is a radially directed boss 68 which is hollow and carries a spring-pressed detent 70. As the arm 32 is rotated by the button 36, the detent 70 rides along the inside surface of the base 26 thereadjacent. With the button 36 in the position shown in FIG. 2, the detent 70 engages in a notch 72 which is the "off" position for the motor. The actual on/off switching means for the motor comprises a pair of arcuate contacts 74 and 76 mounted on the inside of an arcuate contact plate 78. The plate, as shown in FIG. 2, is secured against the lower portion of the leftward end of base 26. The two arcuate contacts are connected respectively to the switch wires (FIG. 2) for the motor.

Carried on the inside of the rotatable hub 30 at the same radius from the axis as the contacts, is the spring contact bridge 80 which is riveted at its center to the hub, and which has its two opposite ends biased out toward the plate 78 to engage the contacts.

Figure 3:
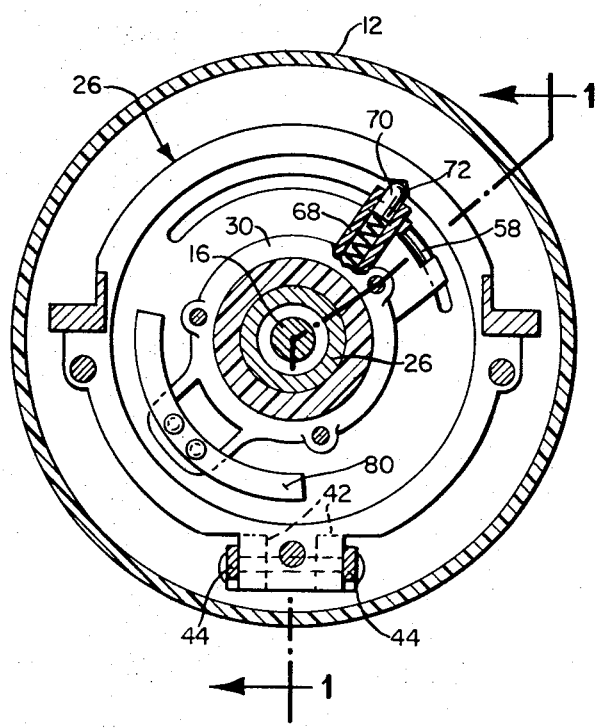
FIG. 3 is a sectional view taken on the line 3—3 of FIG. 1.

It will thus be seen that when the button 36 is in a position counterclockwise of the position shown in FIGS. 2 and 3, the bridge 80 will have its opposite ends engaging respectively the contacts 74 and 76. When the button 36 is in the position of FIG. 2 or is moved clockwise of the position shown in FIGS. 2 and 3, the bridge 80 will not engage the contact 74 at all and the circuit to the motor will be interrupted. The position of FIG. 2 is, of course, the "off position."

The structure described affords a compact, simple, reliable, single element control for both motor speed on/off and beater ejector. It comprises a minimum number of parts and a direct simple design.

I claim:

1. In an electric mixer:
 (a) a housing;
 (b) a power unit in the housing and including a motor having a drive shaft and a driven spindle;
 (c) a beater element having a stem receivable in said spindle, resilient means for releaseably retaining the beater stem in the spindle in operative driving relation, the stem having an outward flange adjacent the spindle;
 (d) an actuator mounted transversely with respect to the mixer housing for rotation around the motor shaft and having a control arm extending through the housing, the actuator having an "off" position intermediate the ends of its travel;
 (e) motor switch means operated by the actuator in the "off" position interrupting the circuit to the motor;
 (f) motor speed control means operated by the actuator for controlling the speed of the motor when the actuator is on one side of the "off" position;
 (g) ejector-operating cam means on the actuator; and the improvement of an ejector lever pivoted at one end in the housing and disposed longitudinally of the housing, the cam means engaging the lever remote from the said end to urge the lever down depressing the flange to overcome the resilient means and release the beater when the actuator is on the other side of the "off" position.

References Cited

UNITED STATES PATENTS

| | | | |
|---|---|---|---|
| 2,930,597 | 3/1960 | Howell et al. | 416—170 |
| 3,271,113 | 9/1966 | Chambers et al. | 416—63 |
| 3,280,351 | 10/1966 | Wolter et al. | 416—170 |
| 3,333,824 | 8/1967 | Jepson et al. | 416—170 |

FOREIGN PATENTS 877,068    9/1961    Great Britain.

EVERETTE A. POWELL, JR., Primary Examiner